US009360989B2

(12) United States Patent
Maekawa et al.

(10) Patent No.: US 9,360,989 B2
(45) Date of Patent: Jun. 7, 2016

(54) INFORMATION PROCESSING DEVICE, AND METHOD FOR CHANGING EXECUTION PRIORITY

(71) Applicant: FUJITSU LIMITED, Kawasaki-shi, Kanagawa (JP)

(72) Inventors: Hiroyuki Maekawa, Kawasaki (JP); Takehiro Nakata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 14/034,630

(22) Filed: Sep. 24, 2013

(65) Prior Publication Data
US 2014/0108996 A1    Apr. 17, 2014

(30) Foreign Application Priority Data
Oct. 11, 2012    (JP) .................................. 2012-226036

(51) Int. Cl.
G06F 3/0481    (2013.01)
G06F 3/0484    (2013.01)
G06F 3/0488    (2013.01)
G06F 9/48    (2006.01)

(52) U.S. Cl.
CPC .......... *G06F 3/04812* (2013.01); *G06F 3/0484* (2013.01); *G06F 3/04883* (2013.01); *G06F 9/4881* (2013.01)

(58) Field of Classification Search
CPC .................................................. G06F 3/04812
USPC ........................................................ 715/781
See application file for complete search history.

(56) References Cited

U.S. PATENT DOCUMENTS

| 7,543,083 | B2 * | 6/2009 | Hayakawa | G06F 11/006 710/8 |
| 2003/0046324 | A1 * | 3/2003 | Suzuki | G05B 19/042 718/100 |
| 2004/0258429 | A1 * | 12/2004 | Moroi | G06F 21/629 399/80 |
| 2006/0041654 | A1 * | 2/2006 | Aki | H04L 67/10 709/223 |
| 2007/0150497 | A1 * | 6/2007 | De La Cruz | H03M 7/3084 |
| 2008/0284867 | A1 * | 11/2008 | Ishihara | H04N 5/23219 348/222.1 |
| 2008/0295104 | A1 * | 11/2008 | Fujihara | G06F 9/4887 718/103 |
| 2009/0080526 | A1 * | 3/2009 | Vasireddy | G06T 7/2013 375/240.16 |
| 2009/0099880 | A1 * | 4/2009 | Doyle | G06Q 10/0633 705/7.27 |

(Continued)

FOREIGN PATENT DOCUMENTS

| JP | 09-138702 A | 5/1997 |
| JP | 09-251389 A | 9/1997 |

(Continued)

OTHER PUBLICATIONS

Office Action of Japanese patent Application No. 2012-226036 dated Jan. 12, 2016 with Partial Translation.

*Primary Examiner* — Reza Nabi
(74) *Attorney, Agent, or Firm* — Maschoff Brennan

(57) ABSTRACT

An information processing device includes a memory, and a processor coupled to the memory and configured to detect an instruction operation of drawing a trajectory of a position specified on a display screen so as to form the trajectory in a given shape, and change an execution priority of at least one program among a plurality of programs being executed when the instruction operation is detected.

15 Claims, 8 Drawing Sheets

(56) References Cited

U.S. PATENT DOCUMENTS

| | | | | |
|---|---|---|---|---|
| 2009/0228837 | A1* | 9/2009 | Suzuki | B60K 35/00 715/841 |
| 2010/0082855 | A1* | 4/2010 | Accapadi | G06F 13/364 710/39 |
| 2010/0251176 | A1* | 9/2010 | Fong | G06F 3/04886 715/821 |
| 2011/0307884 | A1* | 12/2011 | Wabe | G06F 8/60 717/178 |
| 2012/0137302 | A1* | 5/2012 | Tsuchida | G06F 9/4881 718/103 |
| 2012/0166190 | A1* | 6/2012 | Lee | G10L 21/0208 704/233 |
| 2012/0176332 | A1* | 7/2012 | Fujibayashi | G06F 3/04847 345/173 |
| 2012/0240112 | A1* | 9/2012 | Nishiguchi | G06F 9/45558 718/1 |
| 2012/0307294 | A1* | 12/2012 | Matsuda | G06F 3/1219 358/1.15 |
| 2013/0016048 | A1* | 1/2013 | So | G06F 3/038 345/173 |
| 2013/0086577 | A1* | 4/2013 | Nakashima | H04N 21/25808 717/178 |
| 2014/0108996 | A1* | 4/2014 | Maekawa | G06F 3/0484 715/781 |
| 2014/0218343 | A1* | 8/2014 | Hicks | G06F 3/033 345/179 |
| 2015/0163308 | A1* | 6/2015 | Cudak | G10L 15/08 704/246 |

FOREIGN PATENT DOCUMENTS

| | | |
|---|---|---|
| JP | 2007-188289 | 7/2007 |
| JP | 2009-088894 | 4/2009 |

\* cited by examiner

INFORMATION PROCESSING DEVICE, AND METHOD FOR CHANGING EXECUTION PRIORITY

CROSS-REFERENCE TO RELATED APPLICATION

This application is based upon and claims the benefit of priority of the prior Japanese Patent Application No. 2012-226036, filed on Oct. 11, 2012, the entire contents of which are incorporated herein by reference.

FIELD

The embodiments discussed herein are related to an information processing device, a method for changing an execution priority, and a machine readable medium storing a program.

BACKGROUND

In recent years, computers that execute an operating system (OS) program that achieves multitasking are widely used. The multitasking is a function of causing a single computer to simultaneously execute multiple programs such as application software in parallel. As a method for achieving the multitasking, there is a method for causing an OS to provide execution priorities to programs on the basis of degrees of importance of the programs, degrees of urgency of the programs, or the like and selecting a program to be executed on the basis of the provided execution priorities, for example.

Another technique for controlling a priority is described below. For example, there is a technique for repeatedly executing a control processing application program on a priority basis over an information processing application program for one cycle, executing control processing, stopping the execution of the control processing application program by the execution of a stop command for a certain time period, and executing the information processing application program.

In addition, there is a technique for measuring a load that is to be applied to an electronic computer for a certain time period and is a criterion to determine priority switching when the electronic computer tries to automatically switch a priority, determining the timing of the switching, and thereby quickly executing a selected man machine interface process even when a high load is applied to the electronic computer. The techniques are disclosed in Japanese Laid-open Patent Publication Nos. 9-251389 and 9-138702, for example.

SUMMARY

According to an aspect of the invention, an information processing device includes a memory, and a processor coupled to the memory and configured to detect an instruction operation of drawing a trajectory of a position specified on a display screen so as to form the trajectory in a given shape, and change an execution priority of at least one program among a plurality of programs being executed when the instruction operation is detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A user may want to change an execution priority of a program during the execution of a plurality of programs. For example, in order to smoothly reproduce a video image, the user may want to increase an execution priority of a video image reproduction program. An operation of changing an execution priority of a program, however, is not easy.

Hereinafter, the embodiments are described with reference to the accompanying drawings.

First Embodiment

Figure 1:
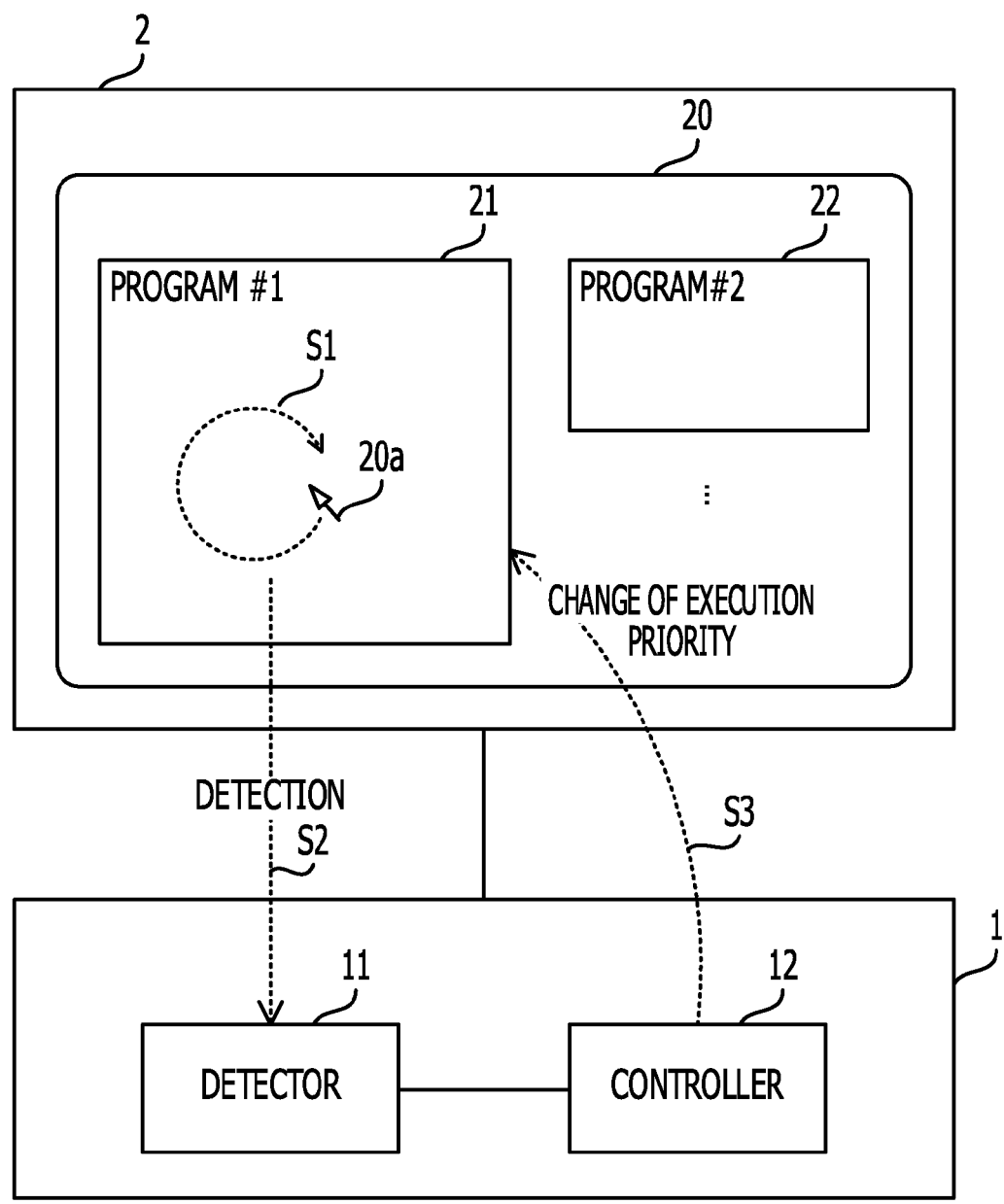
FIG. 1 is a diagram illustrating an information processing device according to a first embodiment.

FIG. 1 is a diagram illustrating an information processing device 1 according to the first embodiment. The information processing device 1 is a device such as a computer that executes programs.

The information processing device 1 has a function of executing multiple programs in parallel. In addition, the information processing device 1 may control execution priorities of programs being executed. For example, the information processing device 1 may increase the execution speed of a certain program by increasing an execution priority of the certain program.

In addition, the information processing device 1 may be connected to a display device 2. The display device 2 displays an image in accordance with a command of the information processing device 1. The display device 2 may be integrated with the information processing device 1.

The information processing device 1 includes a detector 11 and a controller 12. Processes of the detector 11 and controller 12 are achieved by causing a processor included in the information processing device 1 to execute a given program.

The detector 11 monitors an instruction operation on a display screen 20 of the display device 2 and detects a specific instruction operation of drawing a trajectory of a specified position so as to form the trajectory in a given shape. The instruction operation is an input operation of specifying a position on the display screen 20. As illustrated in FIG. 1, as an example, a first embodiment assumes that the instruction operation is an input operation of specifying the position of an instruction image 20a (for example, a mouse cursor) displayed on the display screen 20.

As the specific instruction operation detected by the detector 11, an operation of drawing a trajectory of a specified position so as to form the trajectory in any shape may be assigned. As illustrated in FIG. 1, as an example, the first embodiment assumes that the instruction operation is an operation of rotationally moving the position of the instruction image 20a on the display screen 20 in a given direction.

When the specific instruction operation is detected by the detector 11, the controller 12 changes an execution priority of at least one program among a plurality of programs being executed. The program of which the execution program is to be changed is selected in accordance with an arbitrary rule. For example, when display windows that correspond to the programs being executed are displayed on the display screen 20, the controller 12 changes an execution priority of a program corresponding to a display window displayed in the foreground. Alternatively, the controller 12 may select a program of which an execution priority is to be changed on the basis of positional relationships between a position specified by the detected specific instruction operation and display ranges of the windows on the display screen 20.

When the specific instruction operation is detected, an execution priority of at least one of a plurality of programs being executed is changed. Thus, the user may change the execution priority of the program by performing an easy operation of moving a specified position.

The following describes an example of a process of selecting a program of which an execution priority is to be changed on the basis of positional relationships between the position specified by the specific instruction operation and the display ranges of the display windows on the display screen 20. The following example assumes that a program that corresponds to a display window in which the position specified by the specific instruction operation is included is selected and an execution priority of the selected program is changed. In addition, the following example assumes that the specific instruction operation is an instruction operation of rotating the specified position. As illustrated in FIG. 1, the following example assumes that display windows 21 and 22 are displayed on the display screen 20. The display window 21 corresponds to a program #1 that is being executed, while the display window 22 corresponds to a program #2 that is being executed.

For example, an instruction operation of rotationally moving the displayed instruction image 20a in a display range of the display window 21 corresponding to the program #1 is executed (in step S1). Then, the detector 11 detects the instruction operation of moving the displayed instruction image 20a and determines that the detected instruction operation is an operation of rotating the specified position (in step S2). Next, the controller 12 selects the program #1 corresponding to the display window 21 in which the position specified by the detected instruction operation on the display screen 20 is included. The controller 12 changes an execution priority of the selected program #1. For example, the controller 12 increases the execution priority of the selected program #1 (in step S3).

In the example of the process, the information processing device 1 detects the specific instruction operation of drawing a trajectory of a position specified on the display screen 20 so as to form the trajectory in a given shape or detects the operation of rotationally moving the displayed instruction image 20a, selects a program on the basis of positional relationships between the position specified by the detected specific instruction operation on the display screen 20 and display ranges of the display windows corresponding to the programs #1 and #2 that are being executed, and changes an execution priority of the selected program. Thus, the user may perform an easy operation and thereby change an execution priority of a desired program that is being executed.

The display device 2 may include a touch panel input device (hereinafter referred to as touch panel). In this case, the detector 11 may detect, as an instruction operation, a touch operation performed on the touch panel. In this case, the specific instruction operation may be an arbitrary operation of drawing a given shaped trajectory of a position touched on the touch panel.

Second Embodiment

Next, an example of a process of causing a terminal device 100 to change an execution priority by a cursor operation is described.

Figure 2:
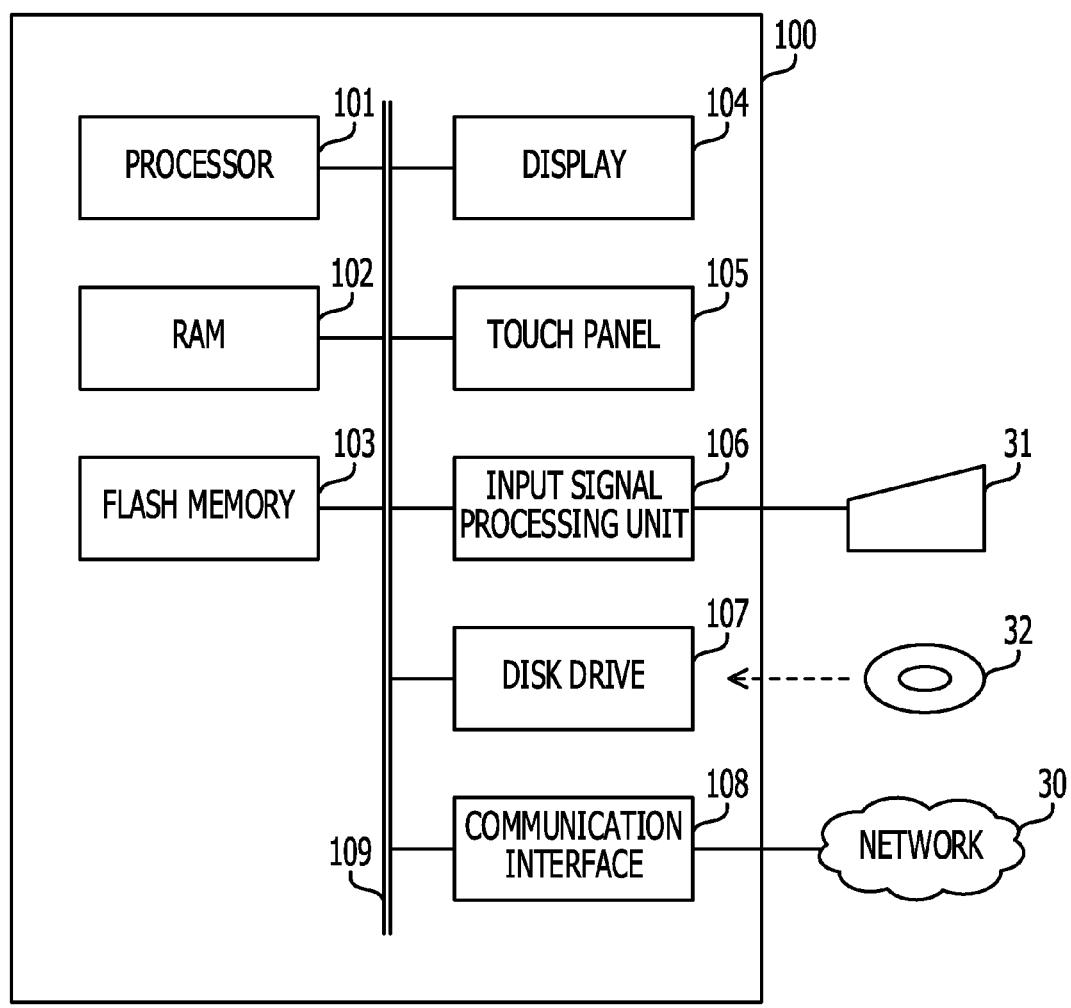
FIG. 2 is a diagram illustrating a terminal device according to a second embodiment.

FIG. 2 is a diagram illustrating the terminal device 100 according to a second embodiment. The terminal device 100 is a computer that executes an OS program that achieves multitasking. The terminal device 100 may be a mobile terminal device such as a tablet personal computer (PC). The terminal device 100 includes a processor 101, a random access memory (RAM) 102, a flash memory 103, a display 104, a touch panel 105, an input signal processing unit 106, a disk drive 107, and a communication interface 108. The units 101 to 108 are connected to a bus 109 in the terminal device 100.

The processor 101 is a device that includes a computing unit that executes a command of a program. The processor 101 loads, into the RAM 102, at least a part of the program and data that are stored in the flash memory 103 and executes the program. The processor 101 may include a plurality of processor cores. The terminal device 100 may include a plurality of processors. The terminal device 100 may use the plurality of processors or the plurality of processor cores to execute processes in parallel. A group of two or more processors, a dedicated circuit such as a field program gate array (FPGA) or an application specific integrated circuit (ASIC), a group of two or more dedicated circuits, and a combination of the processor and the dedicated circuit may be referred to as a "processor".

The RAM 102 is a volatile memory that temporarily stores the program to be executed by the processor 101 and data to be referenced by the program. The terminal device 100 may include a memory of a different type from a RAM. The terminal device 100 may include a plurality of volatile memories.

The flash memory 103 is a nonvolatile storage device that stores programs such as the OS program and application software and data. The terminal device 100 may include a storage device of another type, such as a hard disk drive (HDD) or a solid state drive (SSD). The terminal device 100 may include a plurality of nonvolatile storage devices.

The display 104 displays an image in accordance with a command received from the processor 101. As the display 104, a liquid crystal display (LCD), an organic electro luminescence (EL), or the like may be used.

The touch panel 105 overlaps the display 104. The touch panel 105 detects a touch operation performed by the user on the display 104 and notifies the processor 101 of a touched position as an input signal. For the touch operation, a pointing device such as a touch pen or a finger of the user is used. Types of the detection of the touched position are a matrix switch type, a resistive type, a surface acoustic wave type, an infrared type, an electromagnetic induction type, a capacitive type, and the like, and any of the types of the detection may be used.

The input signal processing unit 106 acquires an input signal from an input device 31 connected to the terminal device 100 and notifies the processor 101 of the acquired input signal. As the input device 31, a pointing device such as a mouse, a keyboard, or the like may be used.

The disk drive 107 is a driving device that reads a program and data that have been stored in a recording medium 32. As the recording medium 32, a magnetic disk such as a flexible disk (FD) or an HDD, an optical disc such as a compact disc (CD) or a digital versatile disc (DVD), or a magneto-optical disk (MO) may be used. The disk drive 107 causes the program and data that are read from the recording medium 32 to be stored in the RAM 102 or the flash memory 103.

The communication interface 108 communicates with another information processing device through a network 30.

The program to be executed by the processor 101 may be copied into the flash memory 103 from another storage device. In addition, the program to be executed by the processor 101 may be downloaded by the communication interface 108 from the network 30.

The terminal device 100 may not include at least one of the disk drive 107 and the communication interface 108. The terminal device 100 may not include any of the touch panel 105 and the input signal processing unit 106. The input device 31 may be integrated with a chassis of the terminal device 100.

Figure 3:
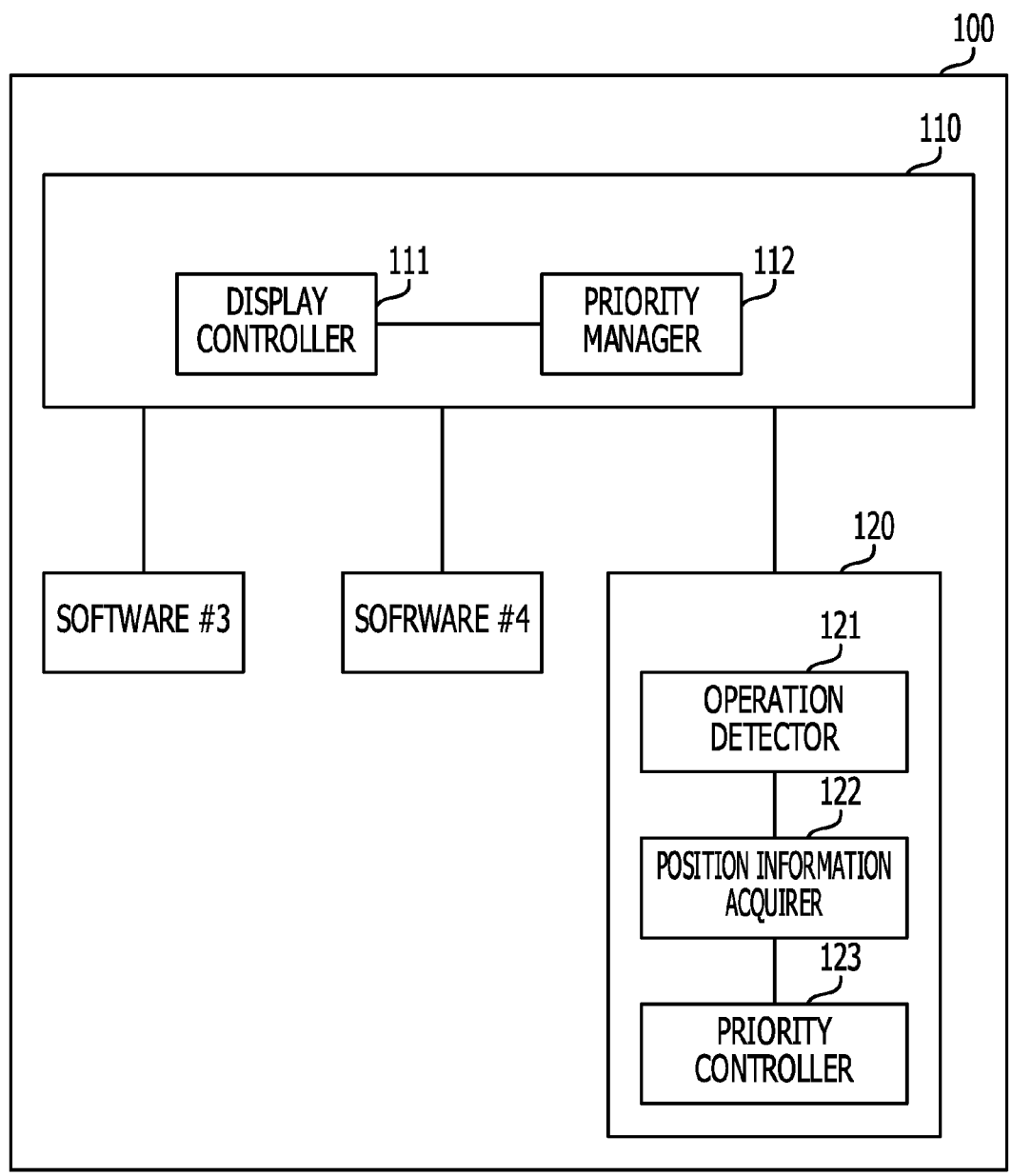
FIG. 3 is a diagram illustrating an example of a program configuration and functions of the terminal device.

FIG. 3 is a diagram illustrating an example of a program configuration and functions of the terminal device 100. In the terminal device 100, software #3 and #4, an OS program 110, and a monitoring program 120 are executed by the processor 101.

The software #3 and #4 is application programs that are executed under an execution environment of the OS program 110. The software #3 and #4 may be antivirus software and video image reproduction software, respectively, for example.

When the software #3 is executed, at least one display window that corresponds to the software #3 is displayed on the display 104. The same applies to the software #4. When an application program other than the software #3 and #4 is executed, at least one display window that corresponds to the application program may be displayed by the execution.

The software #3 and #4 is the application programs of which execution priorities are to be changed by the execution of the monitoring program 120. Hereinafter, an application program of which an execution priority is to be changed by the execution of the monitoring program 120 is referred to as "target software". The number of application programs that are target software is arbitrary. All application programs other than the monitoring programs 120 may be target software.

The OS program 110 is a program for managing hardware resources of the terminal device 100 and the execution of application programs such as the software #3 and #4. The OS program 110 is a multitasking OS program that enables the terminal device 100 to execute a plurality of application programs such as the software #3 and #4 in parallel. The OS program 110 achieves a process of controlling execution priorities of the application programs.

The monitoring program 120 is a program for providing, on the basis of a specific instruction operation by the user, a request to change execution priorities of application programs (such as the software #3 and #4) that are being executed. The present embodiment assumes that the monitoring program 120 is an application program of a certain type. The monitoring program 120, however, may be a part of the OS program 110, for example.

The terminal device 100 includes a display controller 111, a priority manager 112, an operation detector 121, a position information acquirer 122, and a priority controller 123. Processes of the display controller 111 and priority manager 112 are achieved by causing the processor 101 of the terminal device 100 to execute the OS program 110. Processes of the operation detector 121, position information acquirer 122, and priority controller 123 are achieved by causing the processor 101 of the terminal device 100 to execute the monitoring program 120.

The display controller 111 causes a mouse cursor to be displayed on a display screen on the basis of an instruction operation from the input device 31 such as a mouse. The display controller 111 controls displaying of display windows corresponding to application programs being executed. For example, the display controller 111 controls display ranges of the display windows, back and forth relationships of the display windows, and active and inactive states of the display windows.

The priority manager 112 controls execution priorities of application programs being executed. For example, the priority manager 112 controls the execution priorities by adjusting scheduling of threads of the application programs.

For example, information that indicates priorities is added to processes corresponding to the application programs and threads within the processes in advance. The priority manager 112 assigns execution priorities to threads to be executed on the basis of the priorities added to the threads and the processes corresponding to the threads. Then, the priority manager 112 causes a CPU to execute a thread with the highest execution priority. When a thread with a high execution priority waits to be executed (for example, when the terminal device 100 waits for a message), the priority manager 112 causes the CPU to execute a thread with the second highest execution priority. Thus, an application program that corresponds to a thread with a high execution priority is executed on a priority basis, and whereby the execution speed of the application program is increased.

For example, the priority manager 112 may change an execution priority of a thread corresponding to a specified application program from the current priority on the basis of an input operation by the user or a request from the priority controller 123.

The operation detector 121 receives a notification indicating a position (position at which the mouse cursor is displayed in this example) specified by an instruction operation from the display controller 111, analyzes the instruction operation of the user, and determines whether or not a given instruction operation is detected. The given instruction operation may be an instruction operation (hereinafter rotational movement operation) of rotationally moving the position of the displayed mouse cursor. The rotational movement operation may be a touch operation of rotationally moving a position specified by an instruction operation performed by touching the touch panel 105.

The position information acquirer 122 acquires, from the display controller 111, a position specified by the rotational movement operation on the display 104 and display ranges, on the display 104, of display windows corresponding to target software that is being executed.

The priority controller 123 selects target software of which an execution priority is to be changed on the basis of the acquired position specified on the display 104 and the acquired display ranges of the display windows on the display 104. Then, the priority controller 123 requests, on the basis of a rotational movement direction of the rotational movement operation, the priority manager 112 to change the execution priority of the selected target software. For example, if the rotational movement direction of the rotational movement operation is clockwise, the priority controller 123 requests the priority manager 112 to increase the execution priority of the selected target software. If the rotational movement direction of the rotational movement operation is counterclockwise, the priority controller 123 requests the priority manager 112 to reduce the execution priority of the selected target software.

Figure 4:
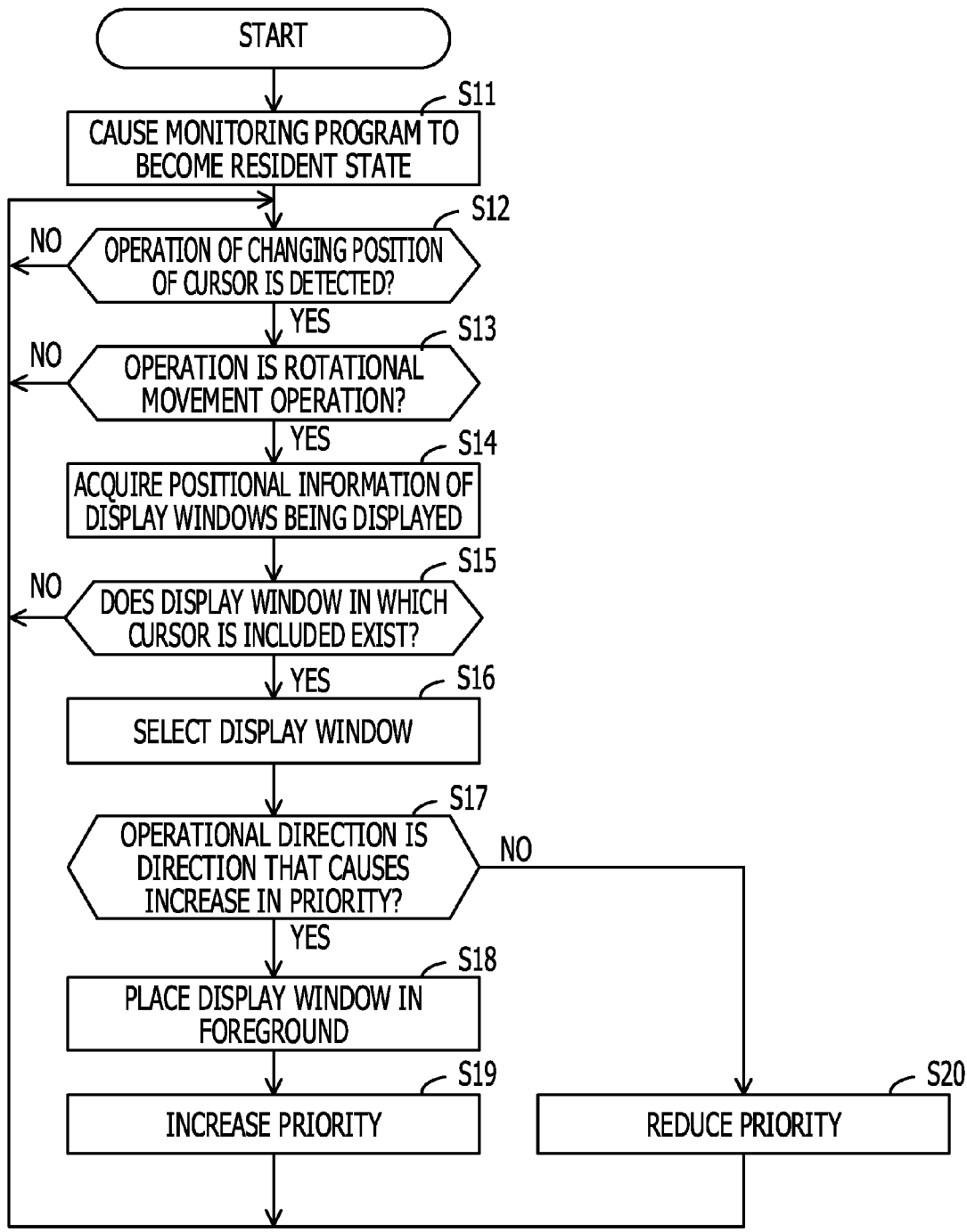
FIG. 4 is a flowchart of an example of a process of changing an execution priority.

FIG. 4 is a flowchart of an example of a process of changing an execution priority. FIG. 4 assumes that the terminal device 100 receives an instruction operation of changing the position of the mouse cursor displayed on the display 104. The following description exemplifies, as information to be used for an interface process of the OS, functions that are used for Windows (registered trademark) of Microsoft Corporation.

In step S11, the monitoring program 120 is activated with the activation of the OS program 110 and becomes a resident state.

In step S12, the operation detector 121 determines, on the basis of a notification received from the display controller 111, whether or not the operation detector 121 has detected an instruction operation of changing the position of the displayed mouse cursor. The operation detector 121 may use GetCursorPos function to acquire the position of the displayed mouse cursor from the display controller 111. If the operation detector 121 detects the instruction operation, the process proceeds to step S13. If the operation detector 121 does not detect the instruction operation, the process of step S12 is executed again.

In step S13, the operation detector 121 determines whether or not the detected instruction operation is the rotational movement operation. If the detected instruction operation is the rotational movement operation, the process proceeds to step S14. If the detected instruction operation is not the rotational movement operation, the process returns to step S12. The operation detector 121 may recognize a rotational direction of the position specified by the rotational movement operation.

In step S14, the position information acquirer 122 uses EnumWindows function to acquire, from the display controller 111, a list of display windows corresponding to target software that is being executed. Then, the position information acquirer 122 uses GetWindowRect function to acquire display ranges of the acquired display windows from the display controller 111. In this case, the position information acquirer 122 recognizes the target software corresponding to the display windows.

In step S15, the priority controller 123 determines whether or not the position specified on the display 104 by the instruction operation acquired in step S13 is included in any of the acquired display ranges of the display windows corresponding to the target software. In this case, the specified position to be determined may be the position of the mouse cursor located when the instruction operation is determined to be the rotational movement operation, for example. Alternatively, the specified position to be determined may be any of the position of the mouse cursor located at the start time of the rotational movement operation, the position (for example, a midpoint) of the mouse cursor located during the rotational movement operation, or all positions specified from the start to end of the rotational movement operation.

If the specified position is included in any of the display ranges of the display windows, the process proceeds to step S16. If the specified position is not included in any of the display ranges of the display windows, the process returns to step S12.

In step S16, the priority controller 123 selects the display window in which the specified position is determined to be included in step S15.

In step S17, the priority controller 123 determines whether or not the rotational movement direction of the rotational movement operation determined in step S13 is a direction (for example, a clockwise direction) that causes an increase in the execution priority. If the rotational movement direction of the rotational movement operation is the direction that causes an increase in the execution priority, the process proceeds to step S18. If the rotational movement direction of the rotational movement operation is not the direction that causes an increase in the execution priority, the process proceeds to step S20.

In step S18, the priority controller 123 uses EnableWindow function to request the display controller 111 to display the display window selected in step S16 in the foreground. If the selected display window is not displayed in the foreground, the display controller 111 causes the selected display window to be displayed in the foreground on the basis of the request.

Whether or not a display window is displayed in the foreground in step S18 may be determined for software corresponding to each of display windows in advance.

In step S19, the priority controller 123 uses GetPriorityClass function to acquire, from the priority manager 112, the current execution priority of the target software corresponding to the display window selected in step S16. The priority controller 123 uses SetPriorityClass function to specify an execution priority higher by a given level than the acquired current execution priority and request the priority manager 112 to change setting of the execution priority of the target software corresponding to the selected display window. Then, the process returns to step S12. The priority manager 112 changes the execution priority of the selected target software to the specified value on the basis of the request from the priority controller 123. Thus, the execution priority of the selected target software is increased by the given level.

In step S20, the priority controller 123 uses GetPriorityClass function to acquire, from the priority manager 112, the current execution priority of the target software corresponding to the display window selected in step S16. The priority controller 123 uses SetPriorityClass function to specify an execution priority lower by a given level than the acquired current execution priority and request the priority manager 112 to change setting of the execution priority of the target software corresponding to the selected display window. Then, the process returns to step S12. The priority manager 112 changes the execution priority of the selected target software to the specified value on the basis of the request from the priority controller 123. Thus, the execution priority of the selected target software is reduced by the given level.

Figure 5:
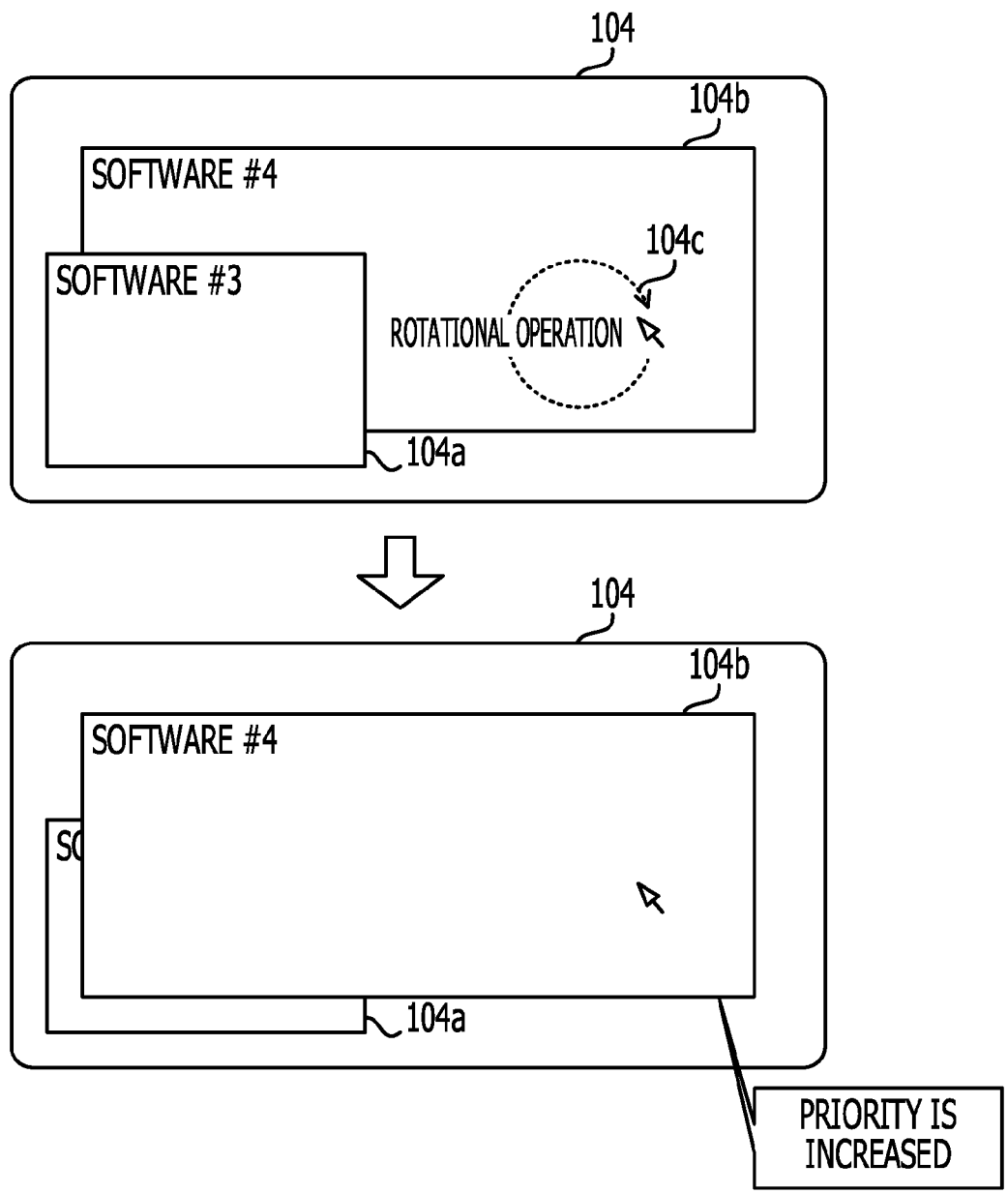
FIG. 5 is a diagram illustrating an example of an operation of the terminal device.
Figure 6:
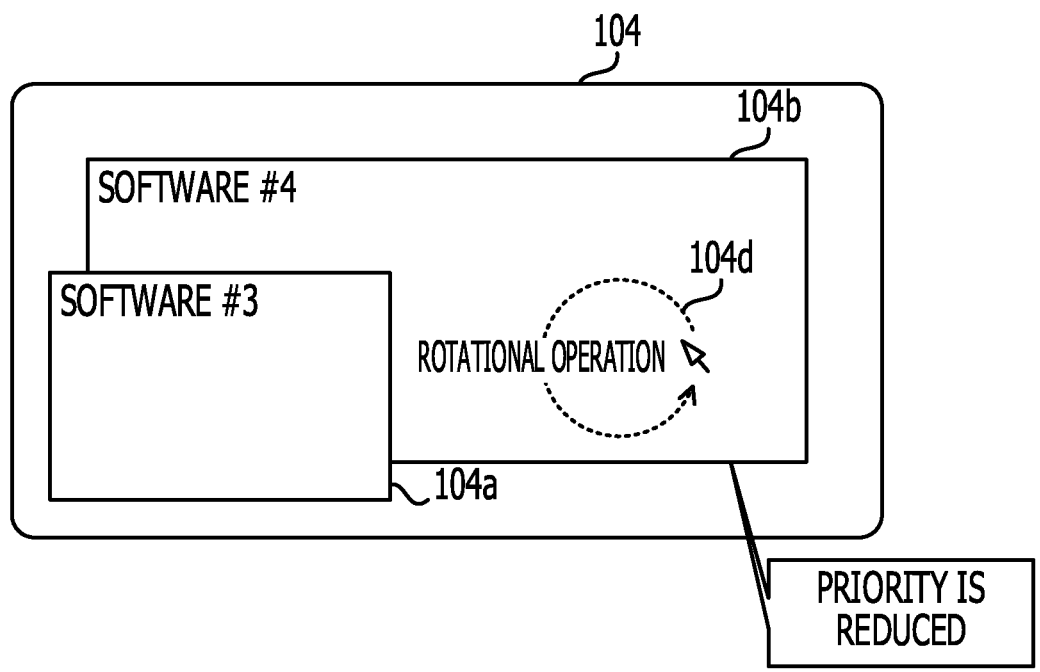
FIG. 6 is a diagram illustrating an example of an operation of the terminal device.

FIGS. 5 and 6 are diagrams illustrating examples of operations of the terminal device 100. In states illustrated on the upper sides of FIGS. 5 and 6, a display window 104a is displayed in front of a display window 104b and overlaps the display window 104b on the display screen of the display 104. The display window 104a corresponds to the software #3 that is being executed, while the display window 104b corresponds to the software #4 that is being executed.

It is assumed that a clockwise rotational movement operation 104c is executed in a display range of the display window 104b corresponding to the software #4 in the state illustrated on the upper side of FIG. 5. As illustrated on the lower side of FIG. 5, the display window 104b is displayed in the foreground by the process (refer to FIG. 4) of step S18. Then, the execution priority of the software #4 corresponding to the display window 104b is increased.

On the other hand, as illustrated in FIG. 6, when a counterclockwise rotational movement operation 104d of which the direction is the opposite of the direction of the operation illustrated on the upper side of FIG. 5 is executed in the display range of the display window 104b corresponding to the software #4, the execution priority of the software #4 corresponding to the display window 104b is reduced.

Thus, the user may intuitively specify an increase or reduction in an execution priority since the instruction operation of increasing the execution priority and the instruction operation of reducing the execution priority are the operations of changing a specified position in the oppose directions. For example, if the user mistakenly specifies software as software of which an execution priority is to be increased, the operation of increasing the execution priority may be easily cancelled by executing the instruction operation in the opposite direction.

If the software #3 is antivirus software and the software #4 is video image reproduction software in the examples of FIGS. 5 and 6, the following cases (1) and (2) are considered.

(1) Although it is acceptable to take time to run a virus check, the user wants a video image to be smoothly reproduced.

(2) Although it is acceptable to drop a frame during the reproduction of a video image by the video image reproduction software, the user wants a virus check by the antivirus software to be quickly terminated.

As illustrated in FIG. 5, the case (1) may be supported by executing the clockwise rotational movement operation 104c within the display range of the video image reproduction software (software #4). In this case, since the display window 104b that corresponds to the video image reproduction software is displayed in the foreground, the user may immediately browse a video image to be reproduced, and the usability may be improved. As illustrated in FIG. 6, the case (2) may be supported by executing the counterclockwise rotational movement operation 104d within the display range of the video image reproduction software (software #4).

According to the second embodiment, the terminal device 100 detects a given instruction operation (such as an operation of moving the mouse cursor or a touch operation on the display 104) on the display 104. Next, the terminal device 100 selects software corresponding to a display window in which a position specified by the given instruction operation is included on the display 104. Then, the terminal device 100 changes an execution priority of the selected software. Thus, the user may change an execution priority of desired software by performing an easy operation.

For example, a recent OS program achieves a function of displaying a list of tasks that are being executed and receiving selection of a task of which an execution priority is to be changed. Relationships between application programs and the tasks, however, are not clear on a task selection screen, and it is difficult for users who do not know programs well to change an execution priority of a desired application program. According to the second embodiment, an application program of which an execution priority is to be changed may be intuitively selected, compared with a method for changing an execution priority using the task selection screen.

According to the second embodiment, the instruction operation of increasing an execution priority and the instruction operation of reducing an execution priority are the instruction operations of changing a specified position in the opposite directions. For example, as the instruction operations, instruction operations of moving the specified position in different manners may be assigned.

Third Embodiment

Next, a third embodiment is described. In the third embodiment, points that are different from the second embodiment are mainly described, and a description of common points is omitted.

In the third embodiment, when a position specified by the rotational movement operation on the display 104 is not included in any of the display ranges of the display windows, the priority controller 123 displays a window that enables an execution priority of arbitrary software being executed on the display 104 to be changed.

Figure 7:
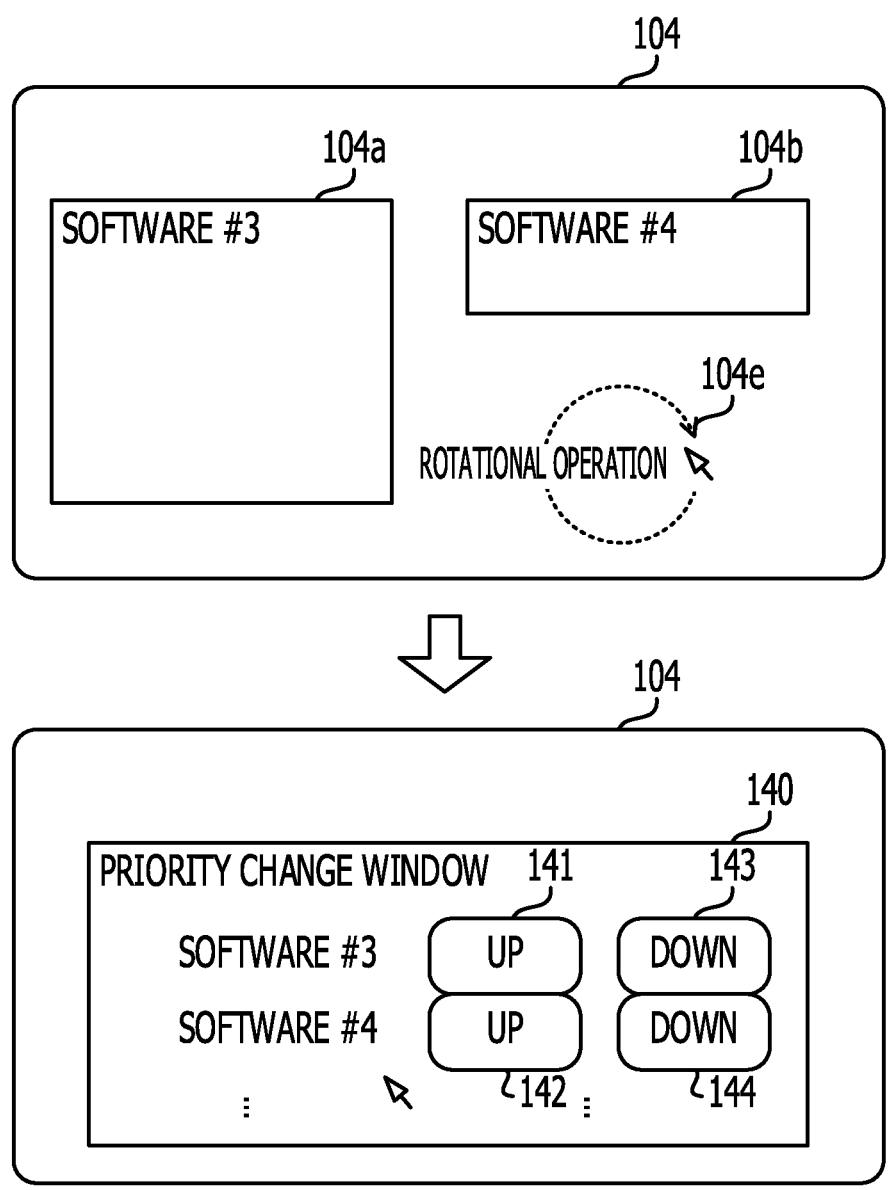
FIG. 7 is a diagram illustrating an example of an operation of the terminal device according to a third embodiment.

FIG. 7 is a flowchart of an example of operations of the terminal device 100 according to the third embodiment. Referring to the upper side of FIG. 7, the display windows 104a and 104b are displayed on the display 104. The display window 104a corresponds to the software #3, while the display window 104b corresponds to the software #4. It is assumed that, in this state, a rotational movement operation 104e is executed within a range that is not included in any of the display ranges of the display windows 104a and 104b.

Referring to the lower side of FIG. 7, a priority change window 140 is displayed on the display 104. The priority change window 140 is a display window that is displayed by the priority controller 123 on the display 104. The priority change window 140 displays a list of software that is being executed by the terminal device 100. The priority change window 140 includes an "increase" button and a "reduce" button for each software that is being executed. When an "increase" button is pressed, the priority controller 123 provides a request to increase a priority of software corresponding to the pressed button by a given level. When a "reduce" button is pressed, the priority controller 123 provides a request to reduce a priority of software corresponding to the pressed button by a given level.

Referring to the lower side of FIG. 7, for example, an "increase" button 141 and a "reduce" button 143 correspond to the software #3, while an "increase" button 142 and a "reduce" button 144 correspond to the software #4.

When the "increase" button 141 is pressed, the priority controller 123 requests the priority manager 112 to increase the execution priority of the software #3. When the "reduce" button 143 is pressed, the priority controller 123 requests the priority manager 112 to reduce the execution priority of the software #3. When the "increase" button 142 is pressed, the priority controller 123 requests the priority manager 112 to increase the execution priority of the software #4. When the "reduce" button 144 is pressed, the priority controller 123 requests the priority manager 112 to reduce the execution priority of the software #4.

Figure 8:
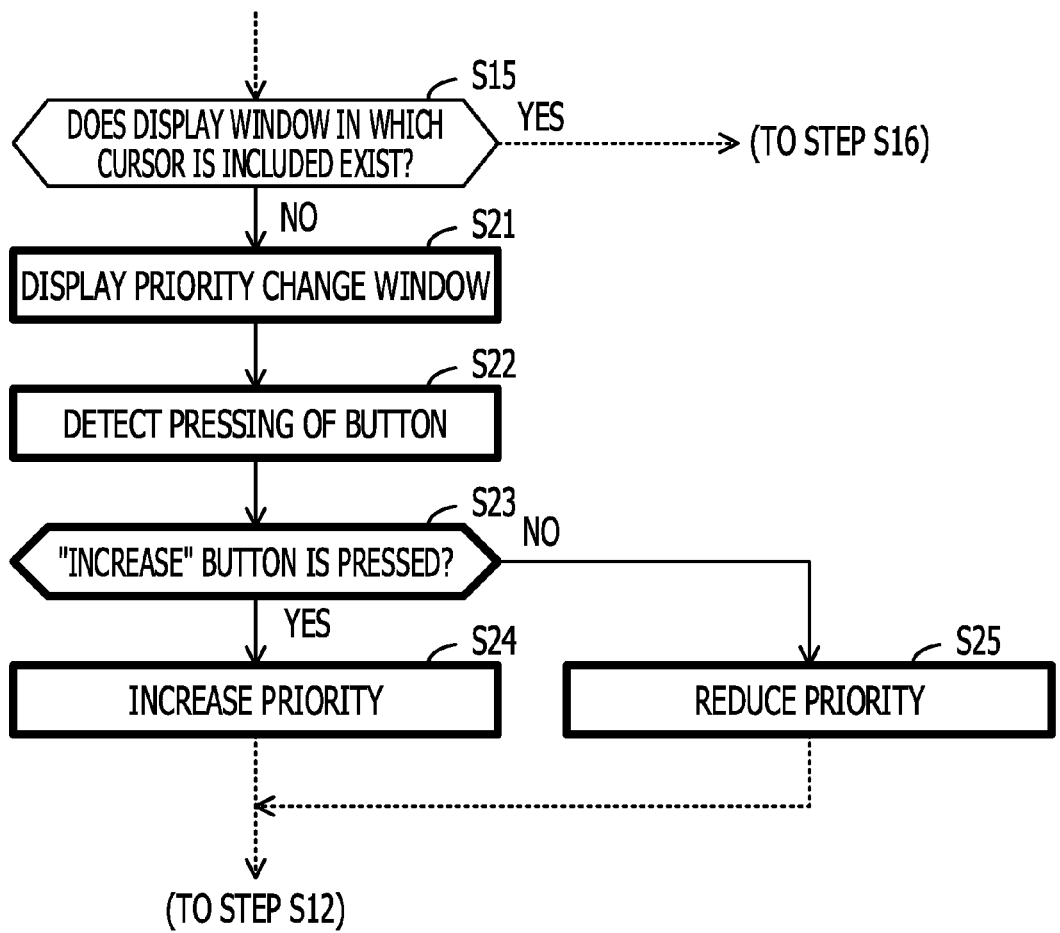
FIG. 8 is a flowchart of an example of a process of displaying a priority change window.

FIG. 8 is a flowchart of an example of a process of displaying the priority change window 140. The flowchart illustrated in FIG. 8 is obtained by changing a part of the process steps of the flowchart illustrated in FIG. 4. In FIG. 8, process steps in which processes that are the same as the flowchart illustrated in FIG. 4 are executed are indicated by the same reference symbols as the flowchart illustrated in FIG. 4.

The priority controller 123 determines whether or not a position specified on the display 104 by the rotational movement operation 104e acquired in step S13 of FIG. 4 is included in any of the display ranges of the display windows acquired in step S14 of FIG. 4 and corresponding to the target software (in step S15). If the position specified on the display 104 by the acquired instruction operation is not included in any of the display ranges of the acquired display windows corresponding to the target software, the priority controller 123 executes processes of steps S21 to S25 instead of causing the process to return to step S12 of FIG. 4.

In step S21, the priority controller 123 acquires a list of software being executed from the priority manager 112, generates the priority change window 140, and displays the priority change window 140 on the display 104.

In step S22, the priority controller 123 detects that a button on the priority change window 140 is pressed.

In step S23, the priority controller 123 determines whether or not the pressed button is an "increase" button. If the pressed button is the "increase" button, the process proceeds to step S24. If the pressed button is not the "increase" button (or if a "reduce" button is pressed), the process proceeds to step S25.

In step S24, the priority controller 123 requests the priority manager 112 to increase a priority of software corresponding to the pressed button by a given level. A specific process procedure of step S24 is the same as step S19 of FIG. 4. Then, the process returns to step S12.

In step S25, the priority controller 123 requests the priority manager 112 to reduce the priority of the software corresponding to the pressed button by a given level. A specific process procedure of step S25 is the same as step S20 of FIG. 4. Then, the process returns to step S12.

According to the third embodiment, if the position specified by the rotational movement operation on the display 104 is not included in any of the display ranges of display windows corresponding to software that is being displayed, the priority change window 140 that enables the execution priorities of the software that is being displayed to be changed is displayed. Thus, even if the position specified by the rotational movement operation on the display 104 is not included in any of the display ranges of the display windows corresponding to the software that is being displayed, the execution priorities of the software that is being executed may be changed.

As a modified example of the third embodiment, if the position specified by the detected operation on the display 104 is not included in any of the display ranges of display windows corresponding to software that is being displayed, the priority controller 123 may restore a previously changed execution priority of software to an execution priority before the previous change. Alternatively, the execution priorities of the software that is being displayed may be restored to execution priorities (for example, execution priorities before the priority manager 112 first receives a request to change the execution priorities from the priority controller 123 after the activation of the OS program 110) determined by the priority manager 112.

If the position specified by the rotational movement operation on the display 104 is not included in any of the display ranges of the display windows corresponding to the software that is being displayed, the priority change window 140 that enables the execution priorities of the software that is being displayed to be changed is displayed. Thus, if the position specified by the rotational movement operation on the display 104 is not included in any of the display ranges of the display windows corresponding to the software that is being displayed, the operability may be improved by assigning an arbitrary process of changing an execution priority.

As described above, the information processing according to the first embodiment may be achieved by causing the information processing device 1 to execute the program, and the information processing according to the second and third embodiments may be achieved by causing the terminal device 100 to execute the program. The program may be stored in a computer-readable recording medium (for example, a recording medium 32). As the recording medium, a magnetic disk, an optical disc, a magneto-optical disc, a semiconductor memory, or the like may be used. The magnetic disk may be an FD or an HDD. The optical disc may be a CD, a CD-R (Recordable)/RW (Rewritable), a DVD, or a DVD-R/RW.

In order to distribute the program, a portable recording medium that stores the program is provided, for example. In addition, the program may be stored in a storage device of another computer and distributed through the network 30. The computer stores, in a storage device (for example, flash memory 103), the program stored in the portable recording medium or received from the other computer, reads the program from the storage device, and executes the program. The computer may directly execute the program read from the portable recording medium or directly execute the program received through the network 30 from the other computer. At least part of the information processing may be achieved by an electronic circuit such as a digital signal processor (DSP), an ASIC, or a programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
a non-transitory memory; and
a processor coupled to the non-transitory memory and configured to:
  detect an instruction operation of drawing a trajectory of a position specified on a display screen so as to form the trajectory in a given shape,
  determine whether the position specified by the detected instruction operation is included in one of a plurality of display windows on the display screen that each correspond to one of a plurality of programs being executed, wherein the determination is made on the basis of a plurality of positional relationships in which each of the plurality of positional relationships is between one of the plurality of display windows and the position specified by the detected instruction;
in response to determining that the position specified by the detected instruction operation is included in one of the display windows, the processor is further configured to:
  select, from among the plurality of programs being executed, a first program that corresponds to the display window that includes the detected instruction operation; and
  change an execution priority of the selected first program; and
in response to determining that the position specified by the detected instruction operation is not included in one of the display windows, the processor is further configured to:
  display an operation window configured to receive an operation of changing execution priorities of the plurality of programs being executed; and
  change, on the basis of a user interaction with a graphical element on the operation window that corresponds to a second program of the plurality of programs, an execution priority of the second program.

2. The information processing device according to claim 1, wherein the processor detects either a first instruction operation of drawing a trajectory of a specified position so as to form the trajectory in a first shape or a second instruction operation of drawing a trajectory of a specified position so as to form the trajectory in a second shape, and wherein when the first instruction operation is detected, the processor increases the execution priority of the selected first program, and when the second instruction operation is detected, the processor reduces the execution priority of the selected first program.

3. The information processing device according to claim 2, wherein the first instruction operation is an operation of moving the specified position in a given direction, and the second instruction operation is an operation of moving the specified position in the opposite direction to the given direction of the first instruction operation.

4. The information processing device according to claim 2, wherein when the first instruction operation is detected, the processor causes a display window corresponding to the selected first program to be displayed in the foreground.

5. The information processing device according to claim 1, wherein the plurality of programs are each associated with a corresponding display window and wherein the detection detects the trajectory of a position in the display window of the at least one program while the plurality of display windows are simultaneously displayed.

6. A method for changing an execution priority in an information processing device, comprising detecting, by a processor, an instruction operation of drawing a trajectory of a position specified on a display screen so as to form the trajectory in a given shape;

determining whether the position specified by the detected instruction operation is included in one of a plurality of display windows on the display screen that each correspond to one of a plurality of programs being executed, wherein the determination is made on the basis of a plurality of positional relationships in which each of the plurality of positional relationships is between one of the plurality of display windows and the position specified by the detected instruction;

in response to determining that the position specified by the detected instruction operation is included in one of the display windows:

selecting, from among the plurality of programs being executed, a first program that corresponds to the display window that includes the detected instruction operation; and changing an execution priority of the selected first program; and in response to determining that the position specified by the detected instruction operation is not included in one of the display windows:

displaying an operation window configured to receive an operation of changing execution priorities of the plurality of programs being executed; and changing, on the basis of a user interaction with a graphical element on the operation window that corresponds to a second program of the plurality of programs, an execution priority of the second program.

7. The method according to claim 6, wherein in the detecting, either a first instruction operation of drawing a trajectory of a specified position so as to form the trajectory in a first shape or a second instruction operation of drawing a trajectory of a specified position so as to form the trajectory in a second shape is detected, and wherein in the changing, when the first instruction operation is detected, the execution priority of the selected first program is increased, and when the second instruction operation is detected, the execution priority of the selected first program is reduced.

8. The method according to claim 7, wherein the first instruction operation is an operation of moving the specified position in a given direction, and the second instruction operation is an operation of moving the specified position in the opposite direction to the given direction.

9. The method according to claim 7, further comprising displaying a display window corresponding to the selected first program in the foreground when the first operation is detected.

10. The method according to claim 6, wherein the plurality of programs are each associated with a corresponding display window and wherein the detection detects the trajectory of a position in the display window of the at least one program while the plurality of display windows are simultaneously displayed.

11. A non-transitory machine readable medium storing a program that, when executed by a processor, causes the processor to perform operations comprising detecting, by a processor, an instruction operation of drawing a trajectory of a position specified on a display screen so as to form the trajectory in a given shape;

determining whether the position specified by the detected instruction operation is included in one of a plurality of display windows on the display screen that each correspond to one of a plurality of programs being executed, wherein the determination is made on the basis of a plurality of positional relationships in which each of the plurality of positional relationships is between one of the plurality of display windows and the position specified by the detected instruction;

in response to determining that the position specified by the detected instruction operation is included in one of the display windows:

selecting, from among a plurality of programs being executed, a first program that corresponds to the display window that includes the detected instruction operation; and changing an execution priority of the selected first program; and in response to determining that the position specified by the detected instruction operation is not included in one of the display windows:

displaying an operation window configured to receive an operation of changing execution priorities of the plurality of programs being executed; and changing, on the basis of a user interaction with a graphical element on the operation window that corresponds to a second program of the plurality of programs, an execution priority of the second program.

12. The non-transitory machine readable medium according to claim 11, wherein in the detecting, either a first instruction operation of drawing a trajectory of a specified position so as to form the trajectory in a first shape or a second instruction operation of drawing a trajectory of a specified position so as to form the trajectory in a second shape is detected, and wherein in the selecting, when the first instruction operation is detected, increasing the execution priority of the selected first program, and when the second instruction operation is detected, decreasing the execution priority of the selected first program.

13. The non-transitory machine readable medium according to claim 12,
wherein the first instruction operation is an operation of moving the specified position in a given direction, and the second instruction operation is an operation of moving the specified position in the opposite direction to the given direction of the first instruction operation.

14. The non-transitory machine readable medium according to claim 12,
wherein when the first instruction operation is detected, a display window that corresponds to the selected first program is displayed in the foreground.

15. The non-transitory machine readable medium according to claim 11, wherein the plurality of programs are each associated with a corresponding display window and wherein the detection detects the trajectory of a position in the display window of the at least one program while the plurality of display windows are simultaneously displayed.

\* \* \* \* \*